United States Patent
Hiratsuka et al.

(10) Patent No.: US 11,942,637 B2
(45) Date of Patent: Mar. 26, 2024

(54) POSITIVE ELECTRODE ACTIVE MATERIAL FOR NONAQUEOUS ELECTROLYTE SECONDARY BATTERY AND NONAQUEOUS ELECTROLYTE SECONDARY BATTERY

(71) Applicant: Panasonic Intellectual Property Management Co., Ltd., Osaka (JP)

(72) Inventors: Hidekazu Hiratsuka, Hyogo (JP); Hiroki Watanabe, Hyogo (JP); Kazunori Donoue, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 427 days.

(21) Appl. No.: 17/417,240

(22) PCT Filed: Nov. 25, 2019

(86) PCT No.: PCT/JP2019/045909
§ 371 (c)(1),
(2) Date: Jun. 22, 2021

(87) PCT Pub. No.: WO2020/137296
PCT Pub. Date: Jul. 2, 2020

(65) Prior Publication Data
US 2022/0059836 A1 Feb. 24, 2022

(30) Foreign Application Priority Data
Dec. 28, 2018 (JP) .................... 2018-247348

(51) Int. Cl.
*H01M 4/525* (2010.01)
*H01M 4/02* (2006.01)
(Continued)

(52) U.S. Cl.
CPC .......... *H01M 4/525* (2013.01); *H01M 4/364* (2013.01); *H01M 4/505* (2013.01);
(Continued)

(58) Field of Classification Search
CPC ...... H01M 4/525; H01M 4/364; H01M 4/505; H01M 10/0525; H01M 2004/021; H01M 2004/028
See application file for complete search history.

(56) References Cited

U.S. PATENT DOCUMENTS

2006/0263691 A1   11/2006   Park et al.
2010/0081055 A1   4/2010    Konishi et al.
(Continued)

FOREIGN PATENT DOCUMENTS

CN   101714630 A    5/2010
EP   2485305 A1     8/2012
(Continued)

OTHER PUBLICATIONS

Office Action dated Mar. 1, 2022, issued in counterpart IN Application No. 202147028935, with English translation. (7 pages).
(Continued)

*Primary Examiner* — Adam A Arciero
(74) *Attorney, Agent, or Firm* — WHDA, LLP (57) ABSTRACT

A positive electrode active material for a nonaqueous electrolyte secondary battery, the positive electrode active material comprising a Ni-containing lithium composite oxide a, b, wherein the Ni-containing lithium composite oxide a has an average primary particle size of 1 μm or more which is larger than the average primary particle size of the Ni-containing lithium composite oxide b, the Ni-containing lithium composite oxide a has an average secondary particle size of 2 to 6 μm, the Ni-containing lithium composite oxide b has an average primary particle size of 0.05 μm or more
(Continued)

and an average secondary particle size of 10 to 20 μm, the Ni-containing lithium composite oxide a contains Mn and at least one of B and Al, the Ni-containing lithium composite oxide b contains Mn, and the ratio of the Ni-containing lithium composite oxide a to the Ni-containing lithium composite oxide b is 5:95 to 55:45.

3 Claims, 2 Drawing Sheets

(51) Int. Cl.
*H01M 4/36* (2006.01)
*H01M 4/505* (2010.01)
*H01M 10/0525* (2010.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2011/0129734 A1 | 6/2011 | Konishi et al. |
| 2015/0064557 A1 | 3/2015 | Kim et al. |
| 2017/0250402 A1 | 8/2017 | Syoji et al. |
| 2018/0287202 A1 | 10/2018 | Matsushita et al. |
| 2018/0358624 A1 | 12/2018 | Narutomi et al. |

FOREIGN PATENT DOCUMENTS

| | | |
|---|---|---|
| JP | 2005-174847 A | 6/2005 |
| JP | 2009-32647 A | 2/2009 |
| JP | 2010-86693 A | 4/2010 |
| JP | 2011-113825 A | 6/2011 |
| JP | 2011-216214 A | 10/2011 |
| JP | 2017-107727 A | 6/2017 |
| JP | 2017-152363 A | 8/2017 |
| WO | 2017/104178 A1 | 6/2017 |

OTHER PUBLICATIONS

English Translation of International Search Report dated Feb. 25, 2020, issued in counterpart Application No. PCT/JP2019/045909. (2 pages).
The Extended European Search Report dated Jan. 7, 2022, issued in counterpart to EP Application No. 19903520.5. (29 pages).
English Translation of Chinese Search Report dated Sep. 22, 2023, issued in counterpart CN application No. 201980085864.9. (3 pages).

POSITIVE ELECTRODE ACTIVE MATERIAL FOR NONAQUEOUS ELECTROLYTE SECONDARY BATTERY AND NONAQUEOUS ELECTROLYTE SECONDARY BATTERY

TECHNICAL FIELD

The present disclosure relates to a positive electrode active material for a non-aqueous electrolyte secondary battery, and a non-aqueous electrolyte secondary battery.

BACKGROUND ART

A positive electrode having a positive electrode mixture layer including two positive electrode active materials having a different average secondary particle size, as a positive electrode active material for a non-aqueous electrolyte secondary battery, has been known recently (e.g., see Patent Literature 1). A combination of a large particle and a small particle having such a particle size difference can enhance the packing density of the positive electrode active material in the positive electrode mixture layer to thereby achieve a larger capacity of the battery.

CITATION LIST

Patent Literature

PATENT LITERATURE 1: Japanese Unexamined Patent Application Publication No. 2011-113825
PATENT LITERATURE 2: International Publication No. WO 2017/104178

SUMMARY

Incidentally, characteristics required for non-aqueous electrolyte secondary batteries include cyclic characteristics, high rate discharge characteristics, and reduction in the amount of Ni and Mn dissolved from the positive electrode active material, in addition to high capacity. Dissolution of Ni and Mn from the positive electrode active material leads to an increase in the resistance of a battery, generation of gas due to decomposition of the electrolyte, or the like, compromising the reliability of the battery in some cases. In order to achieve the reliability of a battery, for example, after a non-aqueous electrolyte secondary battery is stored in a fully charged state at 60° C. for 96 hours, the amount of Ni and Mn dissolved from the positive electrode active material (substantially, the amount of Ni and Mn deposited on the negative electrode) is desirably suppressed to less than 50 ppm.

It is an advantage of the present disclosure to provide a positive electrode active material for a non-aqueous electrolyte secondary battery capable of achieving a large capacity, good cyclic characteristics, and high rate discharge characteristics of a battery and of suppressing the amount of Ni and Mn dissolved.

A positive electrode active material for a non-aqueous electrolyte secondary battery according to one aspect of the present disclosure is a positive electrode active material including Ni-containing lithium composite oxides a and b, wherein the average primary particle size of the Ni-containing lithium composite oxide a is 1 μm or more and larger than the average primary particle size of the Ni-containing lithium composite oxide b, the average secondary particle size of the Ni-containing lithium composite oxide a is 2 μm to 6 μm, the Ni-containing lithium composite oxide b has an average primary particle size of 0.05 μm or more and an average secondary particle size of 10 μm to 20 μm, the Ni-containing lithium composite oxide a includes Mn, includes at least either one of B and Al, contains 55 mol % or more of Ni based on the total number of moles of the metal elements except for Li, and has a crystallite size of 100 nm to 200 nm, the Ni-containing lithium composite oxide b includes Mn, is free of B and Al or has smaller contents of B and Al than those in the Ni-containing lithium composite oxide a, contains 55 mol % or more of Ni based on the total number of moles of the metal elements except for Li, and has a crystallite size of 100 nm to 200 nm, and the mass ratio between the Ni-containing lithium composite oxide a and the Ni-containing lithium composite oxide b is 5:95 to 55:45.

A non-aqueous electrolyte secondary battery according to one aspect of the present disclosure comprises a positive electrode including the above positive electrode active material, a negative electrode, and a non-aqueous electrolyte.

Advantageous Effect of Invention

According to the positive electrode active material of one aspect of the present disclosure, it is possible to achieve a large capacity, good cyclic characteristics, and high rate discharge characteristics of a battery and suppress the amount of Ni and Mn dissolved.

DESCRIPTION OF EMBODIMENTS

The positive electrode active material for a non-aqueous electrolyte secondary battery of one aspect of the present disclosure is a positive electrode active material including Ni-containing lithium composite oxides a and b, wherein the average primary particle size of the Ni-containing lithium composite oxide a is 1 μm or more and larger than the average primary particle size of the Ni-containing lithium composite oxide b, the average secondary particle size of the Ni-containing lithium composite oxide a is 2 μm to 6 μm and is smaller than the average secondary particle size of the Ni-containing lithium composite oxide b, the Ni-containing lithium composite oxide b has an average primary particle size of 0.05 μm or more and an average secondary particle size of 10 μm to 20 μm, the Ni-containing lithium composite oxide a includes Mn, includes at least either one of B and Al, contains 55 mol % or more of Ni based on the total number of moles of the metal elements except for Li, and has a crystallite size of 100 nm to 200 nm, the Ni-containing lithium composite oxide b includes Mn, is free of B and Al or has smaller contents of B and Al than those in the Ni-containing lithium composite oxide a, contains 55 mol % or more of Ni based on the total number of moles of the metal elements except for Li, and has a crystallite size of 100 nm to 200 nm, and the mass ratio between the Ni-containing lithium composite oxide a and the Ni-containing lithium composite oxide b is 5:95 to 55:45.

The Ni-containing lithium composite oxide a having a large primary particle size and a small secondary particle size is conceived to enable good cyclic characteristics and high rate discharge characteristics of a battery to be achieved because of its high lithium ion conductivity. Further, in the Ni-containing lithium composite oxide a including at least either one of B and Al and having a crystallite size of 100 nm to 200 nm, the crystal structure is stabilized. Thus, it is conceived that the amount of Ni and Mn dissolved from the Ni-containing lithium composite oxide a can be suppressed. The Ni-containing lithium composite oxide a having a large primary particle size and a small secondary particle size will become particles having a small surface area, and the area from which Ni and Mn are dissolved will decrease. It is consequently conceived that the amount of Ni and Mn dissolved from the Ni-containing lithium composite oxide a will be suppressed.

Then, mixing the Ni-containing lithium composite oxide a and a Ni-containing lithium composite oxide b having a primary particle size smaller than that of the oxide a and a secondary particle size larger than that of the oxide a at a predetermined mass ratio can raise the packing density of the positive electrode active material in the positive electrode mixture layer, and thus, the capacity of a battery can be made larger. That is, use of the Ni-containing lithium composite oxide b in combination can provide a positive electrode having a packing density that cannot be accomplished only by the Ni-containing lithium composite oxide a or only the Ni-containing lithium composite oxide b. The Ni-containing lithium composite oxide b has a large surface area but has the above predetermined primary particle size and secondary particle size. It is thus conceived that dissolution of Ni and Mu occurs principally on the particle surface and dissolution of Ni and Mn from the interior of the particles is suppressed. Accordingly, use of the Ni-containing lithium composite oxides a and b in combination enables a large capacity, good cyclic characteristics, and high rate discharge characteristics of a battery to be achieved and the amount of Ni and Mn dissolved from the positive electrode active material to be suppressed.

Hereinafter, one example of the embodiment of the non-aqueous electrolyte secondary battery according to the present disclosure will be described in detail. Hereinafter, a cylindrical battery in which an electrode assembly having a wound structure is housed in a cylindrical battery case is exemplified. The electrode assembly may be not limited to the wound type and may be a laminated type formed by alternately laminating a plurality of positive electrodes and a plurality of negative electrodes, one by one, with separators therebetween. The battery case, which is not limited to cylindrical, may be a metal case such as a rectangular (rectangular battery) or coin-shaped (coin-shaped battery) case, a resin case composed of a resin film (laminate battery), or the like.

Figure 1:
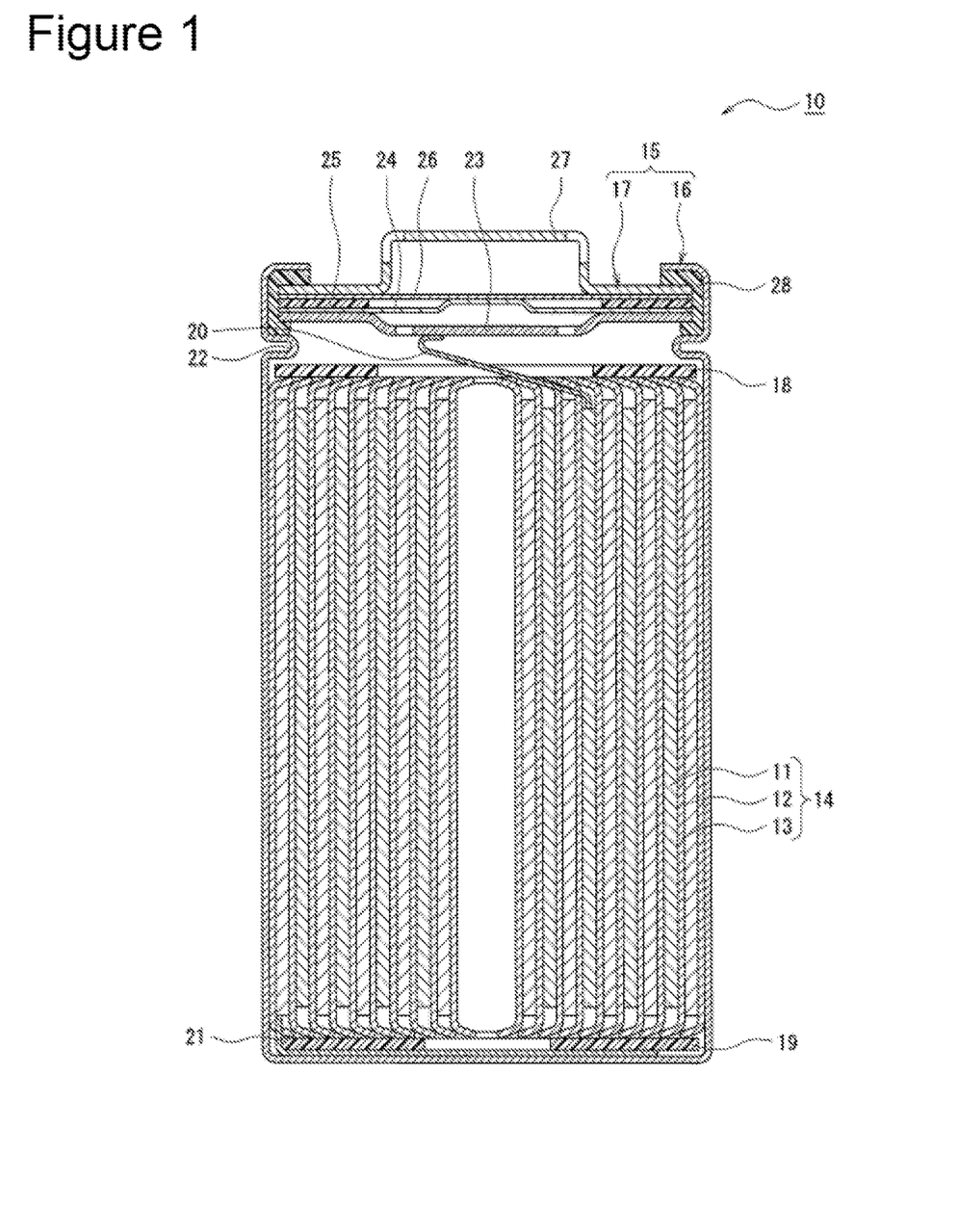
FIG. 1 is a sectional view of a non-aqueous electrolyte secondary battery, which is one example of the embodiment.

FIG. 1 is a sectional view of a non-aqueous electrolyte secondary battery of one example of the embodiment. As exemplified in FIG. 1, the non-aqueous electrolyte secondary battery 10 comprises an electrode assembly 14, a non-aqueous electrolyte, and a battery case 15 that houses the electrode assembly 14 and the non-aqueous electrolyte. The electrode assembly 14 comprises a positive electrode 11, a negative electrode 12, and a separator 13 interposed between the positive electrode 11 and the negative electrode 12. The electrode assembly 14 has a wound structure in which the positive electrode 11 and the negative electrode 12 are wound together with the separator 13 therebetween. The battery case 15 is composed of a bottomed cylindrical exterior can 16 and a sealing assembly 17 blocking the opening of exterior can 16.

The exterior can 16 is, for example, a bottomed cylindrical metal container. A gasket 28 is provided between the exterior can 16 and the sealing assembly 17 to ensure that the interior of the battery is tightly sealed. The exterior can 16 has, for example, a grooved portion 22 which has a portion of a lateral surface projected inward and which supports the sealing assembly 17. The grooved portion 22 is preferably annularly formed along the peripheral direction of the exterior can 16, supporting the sealing assembly 17 by the upper surface thereof.

The sealing assembly 17 has a structure in which the bottom plate 23, a lower vent member 24, an insulating member 25, an upper vent member 26, and the cap 27 are layered, in the order presented, from the side of the electrode assembly 14. The members constituting the sealing assembly 17 each have, for example, a disk shape or a ring shape, and the members except for the insulating member 25 are each electrically connected to one another. The lower vent member 24 and the upper vent member 26 are connected each other at each center part, and the insulating member 25 is interposed between the peripheral edges of the vent members. When the internal pressure of the battery rises due to abnormal heat generation, the lower vent member 24 deforms and breaks so as to push up the upper vent member 26 toward the side of the cap 27, and the current path between the lower vent member 24 and the upper vent member 26 is disconnected. When the internal pressure further increases, the upper vent member 26 breaks, and gas is emitted from the opening of the cap 27.

The non-aqueous electrolyte secondary battery 10 comprises insulating plates 18 and 19 each disposed above and under the electrode assembly 14. In the example shown in FIG. 1, the positive electrode lead 20 attached to the positive electrode 11 extends through a through-hole in the insulating plate 18 to the side of the sealing assembly 17, and the negative electrode lead 21 attached to the negative electrode 12 extends outside the insulating plate 19 to the side of the bottom of the exterior can 16. The positive electrode lead 20 is connected to the lower surface of the bottom plate 23 of the sealing assembly 17, by means of welding or the like. The cap 27 of the sealing assembly 17, electrically connected to the bottom plate 23, serves as the positive electrode terminal. The negative electrode lead 21 is connected to the inner surface of the bottom of the exterior can 16 by means of welding or the like, and the exterior can 16 serves as the negative electrode terminal.

Hereinafter, the positive electrode 11, the negative electrode 12, the separator 13, and the non-aqueous electrolyte constituting the non-aqueous electrolyte secondary battery 10 will be described in detail.

[Positive Electrode]

The positive electrode 11 has a positive electrode current collector and a positive electrode mixture layer formed on both the surfaces of the positive electrode current collector. Foil of a metal that is stable in the electric potential range of the positive electrode 11 such as aluminum and an aluminum alloy, a film with such a metal disposed as an outer layer, and the like can be used for the positive electrode current collector. The positive electrode mixture layer includes a positive electrode active material, a conductive agent, and a binder. The thickness of the positive electrode mixture layer is 10 μm to 150 μm, for example, on one side of the current collector. The positive electrode 11 can be produced by coating a positive electrode mixture slurry including a positive electrode active material, a conductive agent, a binder, and the like on the positive electrode current collector, drying the coating, and compressing the dried coating to form the positive electrode mixture layer on both the surfaces of the positive electrode current collector.

Examples of the conductive agent included in the positive electrode mixture layer include carbon materials such as carbon black, acetylene black, Ketjen black, and graphite. Examples of the binder included in the positive electrode mixture layer include fluorine resins such as polytetrafluoroethylene (PTFE) and polyvinylidene fluoride (PVdF), polyacrylonitrile (PAN), polyimides, acrylic resins, and polyolefins. These resins may be combined with carboxymethyl cellulose (CMC) or a salt thereof, polyethylene oxide (PEO), or the like.

As a positive electrode active material, the positive electrode mixture layer includes Ni-containing lithium composite oxides a and b, which are two composite oxides having a different average primary particle size and a different average secondary particle size. The Ni-containing lithium composite oxide a is a composite oxide including Li, Ni, and Mn and including at least either one of B and Al. Alternatively, the Ni-containing lithium composite oxide b is a composite oxide including Li, Ni, and Mn and being free of B and Al, or alternatively a composite oxide including Li, Ni, and Mn, including at least either one of B and Al, and having contents of B and Al lower than contents of B and Al in the Ni-containing lithium composite oxide a. The positive electrode mixture layer may include other positive electrode active material than the Ni-containing lithium composite oxides a and b as long as objects of the present disclosure are not compromised. However, in the present embodiment, only the Ni-containing lithium composite oxides a and b are included as the positive electrode active material.

Figure 2:
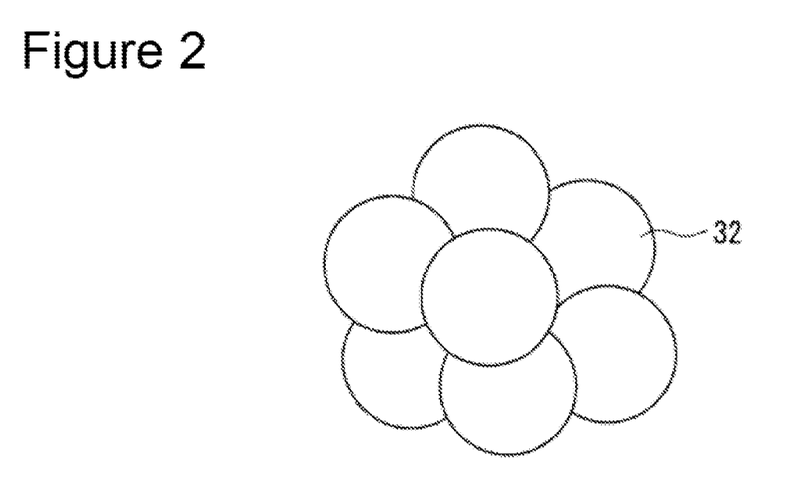
FIG. 2 is a schematic view illustrating a Ni-containing lithium composite oxide a as an exemplary embodiment.
Figure 3:
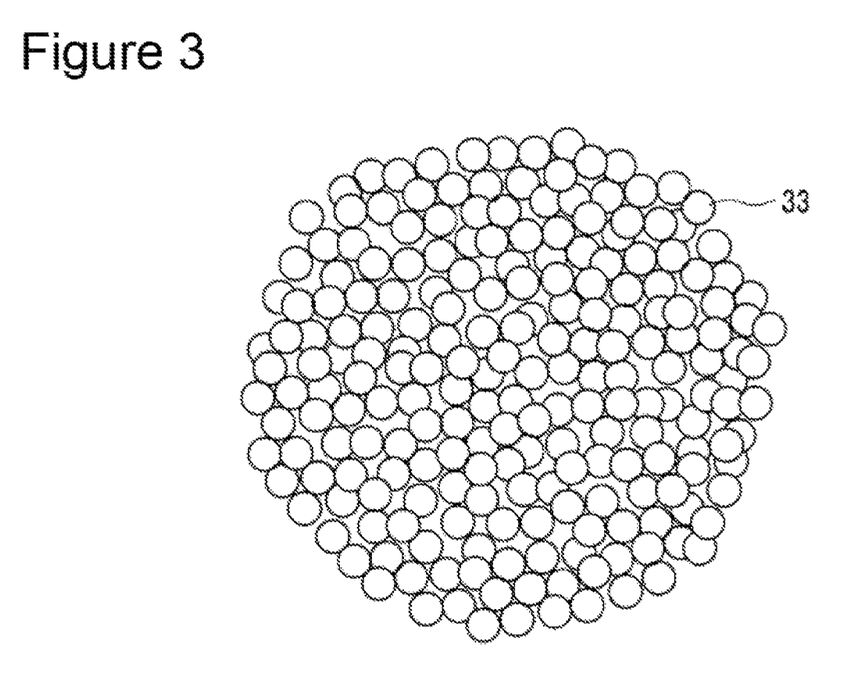
FIG. 3 is a schematic view illustrating a Ni-containing lithium composite oxide b as an exemplary embodiment.

FIG. 2 is a schematic view illustrating the Ni-containing lithium composite oxide a, and FIG. 3 is a schematic view illustrating the Ni-containing lithium composite oxide b. As shown in FIG. 2 and FIG. 3, the Ni-containing lithium composite oxides a and b each are a secondary particle formed by aggregation of primary particles 32 and 33, respectively. The Ni-containing lithium composite oxide a (secondary particle) has a particle size smaller than that of the Ni-containing lithium composite oxide b (secondary particle). In contrast, the primary particles 32 constituting the Ni-containing lithium composite oxide a are larger than the primary particles 33 constituting the Ni-containing lithium composite oxide b. Use of the Ni-containing lithium composite oxides a and b in combination enables a large capacity, good cyclic characteristics, and high rate discharge characteristics of a battery to be achieved and the amount of Ni and Mn dissolved from the positive electrode active material to be suppressed.

In view of a larger capacity and the like, in the Ni-containing lithium composite oxide a, the proportion of Ni may be 55 mol % or more, preferably 70 mol % or more, more preferably 80 mol % or more based on the total number of moles of the metal elements except for Li. In view of good cyclic characteristics, high rate discharge characteristics, and the like, in the Ni-containing lithium composite oxide a, the proportion of Mn is preferably 5 mol % or more and 35 mol % or less based on the total number of moles of the metal elements except for Li. The proportion by mass of each of B and Al included in the Ni-containing lithium composite oxide a is preferably 200 ppm or more and 1000 ppm or less, for example, with respect to the composite oxide a. When the content of each of B and Al is out of the above range, the capacity of the battery may be lowered in comparison with the case where the content falls within the above range.

In view of a larger capacity and the like, in the Ni-containing lithium composite oxide b, the proportion of Ni may be 55 mol % or more, preferably 70 mol % or more, more preferably 80 mol % or more based on the total number of moles of the metal elements except for Li. In view of good cyclic characteristics, high rate discharge characteristics, and the like, in the Ni-containing lithium composite oxide b, Mn is preferably 5 mol % or more and 35 mol % or less based on the total number of moles of the metal elements except for Li. The proportion by mass of each of B and Al in the Ni-containing lithium composite oxide b is, for example, preferably 100 ppm or less, preferably 0 ppm or more and 50 ppm or less with respect to the composite oxide a. When the content of B and Al is out of the above range, the capacity of the battery may be lowered in comparison with the case where the content falls within the above range.

The Ni-containing lithium composite oxides a and b may include an element other than the above elements, and examples thereof includes at least one element selected from Co, Mg, Zr, Mo, W, Cr, V, Ce, Ti Fe, Si, K, Ga, In, Ca, and Na. Among these elements, the Ni-containing lithium composite oxides a and b preferably contain at least Co, and further, more preferably contain at least one type of metal element selected from Mg, Zr, Mo, W, Cr, V, Ce, Ti, Fe, K, Ga, and In.

The average particle size of the primary particles 32 of the Ni-containing lithium composite oxide a (hereinafter, may be referred to as the "average primary particle size a") is 1 μm or more and larger than the average particle size of the primary particles 33 of the Ni-containing lithium composite oxide b (hereinafter, may be referred to as the "average primary particle size b"). The average particle size of the secondary particles of the Ni-containing lithium composite oxide a (hereinafter, may be referred to as the "average secondary particle size a") is 2 μm to 6 μm and smaller than the average particle size of the secondary particles of the Ni-containing lithium composite oxide b (hereinafter, may be referred to as the "average secondary particle size b"). The Ni-containing lithium composite oxide b has an average primary particle size b of 0.05 μm or more and an average secondary particle size b of 10 μm to 20 μm. Thereby, for example, it is possible to achieve a large capacity, good cyclic characteristics, and high rate discharge characteristics of a battery and suppress the amount of Ni and Mn dissolved from the positive electrode active material.

In view of enabling a large capacity, good cyclic characteristics, high rate discharge characteristics of a battery to be achieved, the amount of Ni and Mn dissolved to be suppressed, and the like, the average primary particle size a of the Ni-containing lithium composite oxide a is preferably 1 μm to 5 μm and more preferably 1 μm to 4 μm. The average primary particle size b of the Ni-containing lithium composite oxide b is preferably 0.05 μm to 0.5 μm and more preferably 0.05 μm to 0.2 μm.

The average primary particle sizes a and b can be determined by analyzing a cross-sectional SEM image observed with a scanning electron microscope (SEM). For example, the positive electrode is embedded into a resin, and a cross section of the positive electrode mixture layer is prepared by cross section polisher (CP) processing or the like. The cross section is imaged by an SEM. Alternatively, each powder of the Ni-containing lithium composite oxides a and b is embedded into a resin, and each particle cross section of the composite oxides is prepared by CP processing or the like.

The cross section is imaged by an SEM. Then, 30 primary particles are randomly selected from this cross-sectional SEM image. The grain boundaries of 30 particles of the selected primary particles are observed, and the contour of the primary particles is identified. Then, the major axis (longest diameter) of each of the 30 primary particles is determined, and the average value thereof is taken as the average primary particle size a or b.

The average secondary particle sizes a and b can also be determined from the above cross-sectional SEM image. Specifically, 30 secondary particles (Ni-containing lithium composite oxide a or b) are randomly selected from the above cross-sectional SEM image. The grain boundaries of the selected 30 secondary particles are observed, and the contour of the secondary particles is identified. Then, the major axis (longest diameter) of each of the 30 secondary particles is determined, and the average value thereof is taken as the average secondary particle size a or b.

In view of suppressing the amount of Ni and Mn dissolved and the like, the crystallite size of the Ni-containing lithium composite oxides a and b may be 100 nm to 300 nm and is preferably 120 nm to 250 nm. The crystallite size of the Ni-containing lithium composite oxides herein is the crystallite size in the (110) vector direction perpendicular to the (003) vector direction, which is the direction in which layers are stacked in a layered rock salt type crystal structure.

The crystallite size of the Ni-containing lithium composite oxides a and b can be calculated by analyzing an X-ray diffraction pattern obtained by the X-ray diffraction method with a whole powder pattern decomposition method (hereinafter, referred to as the "WPPD method").

X-ray diffraction measurement is conducted with a counting time: one second per step from 10° to 120° using a PSD (LYNX EYE) as the detector and CuKα1 (wavelength: 1.5418 Å) as the tube bulb at a tube voltage of 40 kV, a tube current of 40 mA, a slit width of 0.3°, and a step width of 0.03°.

The analysis procedure by the WPPD method is as follows.

Step 1: Start the software (TOPAS3) and load measurement data.

Step 2: Set Emission Profile
(Select Cu tube bulb and Bragg Brentano focusing geometry).

Step 3: Set background
(Use Legendre's polynomial as Profile function, and set the number of terms to 8 to 20).

Step 4: Set Instrument
(Use Fundamental Parameter, and input Slit conditions, Filament length, and Sample length).

Step 5: Set Corrections
(Use Sample displacement. Use also Absorption if the sample packing density in the sample holder is low. In this case, fix Absorption to the linear absorption coefficient of the measurement sample).

Step 6: Set crystal structure
(Set to Space group R3-m. Use Lattice constant/Crystallite size/Lattice strain. Set profile broadening due to crystallite size and lattice strain to Lorentzian).

Step 7: Execute calculation
(Refine Background, Sample displacement, Diffraction intensity, Lattice constant, Crystallite size, and Lattice strain, and use the Le-ball equation for calculation).

Step 8: End analysis if the standard deviation of the crystallite size is 6% or less of the refined value. Proceed to Step 9 if the standard deviation is greater than 6% of the refined value.

Step 9: Set Profile broadening due to lattice strain to Gaussian
(Keep Lorentzian for crystallite size).

Step 10: Execute calculation
(Refine Background, Sample displacement, Diffraction intensity, Lattice constant, Crystallite size, and Lattice strain).

Step 11: End analysis if the standard deviation of the crystallite size is 6% or less of the refined value. Analysis fails if the standard deviation is greater than 6% of the refined value.

In view of making the capacity of the battery larger by enhancing the amount to be filled and the like, the mass ratio between the Ni-containing lithium composite oxide a and the Ni-containing lithium composite oxide b may be 5:95 to 55:45 and is preferably 10:90 to 50:50 or 25:75 to 45:65.

Hereinafter, one example of a method for producing the Ni-containing lithium composite oxides a and b will be described in detail.

The Ni-containing lithium composite oxide a is synthesized via a first firing step of firing a first mixture including a lithium compound and a transition metal compound containing 55 mol % or more of Ni and a predetermined amount of Mn and a second firing step of firing a second mixture including the fired product and an Al-containing compound and a B-containing compound.

<First Firing Step>

The particle size of the transition metal compound (D50) is, for example, preferably 1 μm to 6 μm and more preferably 3 μm to 4 μm. The content of Li in the first mixture is preferably 1.03 to 1.10 and more preferably 1.05 to 1.07 as a molar ratio based on the total amount of the transition metal. The firing temperature of the first mixture is preferably 850° C. to 960° C. and more preferably 880° C. to 930° C. The firing time is, for example, 3 hours to 10 hours. The firing is conducted, for example, under a flow of oxygen. When the particle size of the transition metal compound (D50), the content of Li in the first mixture, the firing temperature, and the like are within the ranges, adjustment of the average primary particle size and average secondary particle size and the crystallite size of the Ni-containing lithium composite oxide a within the above ranges is easily achieved.

<Second Firing Step>

The firing temperature of the second mixture is preferably from 600° C. to 900° C. and more preferably from 700° C. to 800° C. The firing time is, for example, 5 hours to 20 hours.

The Ni-containing lithium composite oxide b is synthesized via a first firing step of firing a first mixture including a lithium compound and a transition metal compound containing 55 mol % or more of Ni and a predetermined amount of Mn. When Al and B are added, added is a second firing step of firing a second mixture including the fired product obtained the first firing step, and an Al-containing compound and a B-containing compound.

<First Firing Step>

The particle size of the transition metal compound (D50) is, for example, preferably 7 μm to 20 μm and more preferably 10 μm to 18 μm. The content of Li in the first mixture is preferably 1.03 to 1.10 and more preferably 1.05 to 1.07 as a molar ratio based on the total amount of the transition metal. The firing temperature of the first mixture is preferably 860° C. to 990° C. and more preferably 880° C. to 960° C. The firing time is, for example, 3 hours to 10 hours. The firing is conducted, for example, under a flow of oxygen or air. When the particle size of the transition metal compound (D50), the content of Li in the first mixture, the firing temperature, and the like are within the ranges, adjustment of the average primary particle size and average secondary particle size and the crystallite size of the Ni-containing lithium composite oxide b within the above ranges is easily achieved.

<Second Firing Step>

The firing temperature of the second mixture is preferably from 600° C. to 900° C. and more preferably from 700° C. to 800° C. The firing time is, for example, 5 hours to 20 hours.

[Negative Electrode]

The negative electrode 12 has a negative electrode current collector and a negative electrode mixture layer formed on both the surfaces of the negative electrode current collector. Foil of a metal that is stable in the electric potential range of the negative electrode 12, such as copper, a copper alloy, or the like, a film with such a metal disposed as an outer layer, and the like can be used for the negative electrode current collector.

The negative electrode mixture layer includes a negative electrode active material and a binder. The thickness of the negative electrode mixture layer is 10 µm to 150 µm, for example, on one side of the current collector. The negative electrode 12 can be produced by coating a negative electrode mixture slurry including a negative electrode active material, a binder, and the like on the negative electrode current collector, drying the coating, and rolling the dried coating to form the negative electrode mixture layer on both the surfaces of the negative electrode current collector The negative electrode active material including in the negative electrode mixture layer is not particularly limited as long as being capable of reversibly intercalating and releasing lithium ions. A carbon material such as graphite is generally used. Graphite may be either of natural graphite such as flaky graphite, massive graphite, or earthy graphite or artificial graphite such as massive artificial graphite, or graphitized mesophase carbon microbeads. Alternatively, as the negative electrode active material, a metal to be alloyed with Li such as Si and Sn, a metal compound including Si, Sn, or the like, a lithium-titanium composite oxide, or the like may be used. For example, a Si-containing compound represented by $SiO_x$ ($0.5 \leq x \leq 1.6$), a Si-containing compound including Si particulates dispersed in a lithium silicate phase represented by $Li_{2y}SiO_{(2+y)}$ ($0<y<2$), or the like may be used in combination with graphite.

As the binder included in the negative electrode mixture layer, as in the case of the positive electrode 11, a fluorine-containing resin such as PTFE and PVdF, PAN, a polyimide, an acryl resin, a polyolefin, or the like may be used, but styrene-butadiene rubber (SBR) is preferably used. The negative electrode mixture layer may also include CMC or a salt thereof, polyacrylic acid (PAA) or a salt thereof, polyvinyl alcohol (PVA), or the like.

[Separator]

For example, an ion-permeable and insulating porous sheet is used as the separator 13. Specific examples of the porous sheet include a microporous thin film, woven fabric, and nonwoven fabric. Suitable examples of the material for the separator include polyolefins such as polyethylene and polypropylene, and cellulose. The separator 13 may have a single-layer structure or may have a layered structure. On the surface of the separator 13, a layer of a resin having high heat resistance such as an aramid resin or a filler layer including an inorganic compound filler may be provided.

[Non-Aqueous Electrolyte]

For example, the non-aqueous electrolyte includes a non-aqueous solvent and an electrolyte salt dissolved in the non-aqueous solvent. As the non-aqueous solvent, esters, ethers, nitriles such as acetonitrile, amides such as dimethylformamide, and mixed solvents of two or more thereof can be used. The non-aqueous solvent may contain a halogen-substituted product formed by replacing at least one hydrogen atom of any of the above solvents with a halogen atom such as fluorine. Examples of the halogen-substituted product include fluorinated cyclic carbonate esters such as fluoroethylene carbonate (FEC), fluorinated chain carbonate esters, and fluorinated chain carboxylate esters such as methyl fluoropropionate (FMP).

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where $1<x<6$, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$ and $LiN(ClF_{2l+1}SO_2)(C_mF_{2m+1}SO_2)$ (where 1 and m are each an integer of 0 or more). These lithium salts may be used singly or two or more thereof may be mixed and used. Among these, $LiPF_6$ is preferably used in view of ionic conductivity, electrochemical stability, and other properties. The concentration of the lithium salt is, for example, 0.8 mol to 1.8 mol per 1 L of a non-aqueous solvent.

EXAMPLES

Hereinafter, the present disclosure will be further described with reference to examples, but the present disclosure is not intended to be limited to the following examples.

Example 1

[Synthesis of Ni-Containing Lithium Composite Oxide a]

A transition metal hydroxide represented by $Ni_{0.60}Co_{0.20}Mn_{0.20}(OH)_2$ (D50: 3.7 µm, tap density: 1.7 g/cc) and LiOH were mixed such that the molar ratio of Li based on the total amount of Ni, Co and Mn was 1.07.

Thereafter, this mixture was fired at 925° C. for 10 hours under a flow of oxygen (first firing step) to thereby obtain a first fired product of a Ni-containing lithium composite oxide. Then, a B-containing metal complex was added such that the amount of B was 0.005 parts by mass (500 ppm) based on 100 parts by mass of the first fired product, an Al-containing metal complex was added such that the amount of Al was 0.005 parts by mass (500 ppm) based on 100 parts by mass of the first fired product, and the mixture was maintained at 700° C. for 5 hours (second firing step) to thereby obtain a Ni-containing lithium composite oxide a (second fired product).

The Ni-containing lithium composite oxide a had an average primary particle size of 3 μm and an average secondary particle size of 4 μm. The method for measuring the average particle size is as described above.

An X-ray diffraction pattern of the Ni-containing lithium composite oxide a obtained by an X-ray diffraction method was analyzed. As a result, the crystallite size was 200 nm. Conditions for measurement for the X-ray diffraction method and the like are as described above. Calculation of the composition of the Ni-containing lithium composite oxide a with an ICP emission spectral analysis (manufactured by Thermo Fisher Scientific K.K., an ICP emission spectral analyzer iCAP6300 was used), the proportion of Ni was 60 mol %, the proportion of Mn was 20 mol %, the proportion of Co was 20 mol %, B was 500 ppm, and Al was 500 ppm.

[Synthesis of Ni-Containing Lithium Composite Oxide b]

A transition metal oxide represented by $Ni_{0.60}Co_{0.20}Mn_{0.20}(OH)_2$ (D50: 17.0 μm, tap density: 2.3 g/cc) and LiOH were mixed such that the molar ratio of Li based on the total amount of Ni, Co and Mn was 1.07. Thereafter, this mixture was fired at 885° C. for 10 hours under a flow of oxygen to thereby obtain a Ni-containing lithium composite oxide b.

The average primary particle size of the Ni-containing lithium composite oxide b was smaller than that of the Ni-containing lithium composite oxide a and was 0.1 μm. The average secondary particle size of the Ni-containing lithium composite oxide b was larger than that of the Ni-containing lithium composite oxide a and was 16 μm.

The crystallite size of the Ni-containing lithium composite oxide b was 135 nm. The composition of the Ni-containing lithium composite oxide b was $Li_{1.07}Ni_{0.60}Co_{0.20}Mn_{0.20}O_2$.

[Production of Positive Electrode]

As the positive electrode active material, a mixture of the Ni-containing lithium composite oxides a and b at a mass ratio of 50:50 was used. Mixed were 97.5 mass % of the positive electrode active material, 1 mass % of carbon black, and 1.5 mass % of polyvinylidene fluoride. This mixture was mixed with N-methyl-2-pyrrolidone (NMP) to prepare a positive electrode mixture slurry. The slimy was coated onto both the surfaces of a positive electrode current collector having a thickness of 15 μm composed of aluminum foil by a doctor blade method. After the coating was dried, the coating was rolled using a rolling roller at a pressure of 500 MPa to produce a positive electrode in which a positive electrode mixture layer was formed on both the surfaces of the positive electrode current collector. A portion at which no positive electrode mixture layer was formed was provided on the center portion in the longitudinal direction of the positive electrode current collector, and a positive electrode tab was attached to the portion. The thickness of the positive electrode mixture layer was set to about 140 μm, and the thickness of the positive electrode was set to about 300 μm.

[Production of Negative Electrode]

Mixed were 98.2 mass % of graphite, 0.7 mass % of styrene-butadiene rubber, and 1.1 mass % of sodium carboxymethyl cellulose. This mixture was mixed with water to prepare a negative electrode mixture slurry. The slurry was coated onto both the surfaces of a negative electrode current collector composed of 8-μm thick copper foil by a doctor blade method. After the coating was dried, the coating was rolled using a rolling roller to produce a negative electrode in which a negative electrode mixture layer was formed on both the surfaces of the negative electrode current collector. A portion at which no negative electrode mixture layer was formed was provided on both the end portions in the longitudinal direction of the negative electrode current collector, and a negative electrode tab was attached to the portions. The thickness of the negative electrode mixture layer was set to about 120 μm, and the thickness of the negative electrode was set to about 250 μm.

[Preparation of Non-aqueous Electrolyte Solution]

To a non-aqueous solvent obtained by mixing equal volumes of ethylene carbonate (EC) and diethyl carbonate (DEC), $LiPF_6$ was dissolved at a concentration of 1.6 mol/L to obtain a non-aqueous electrolyte solution.

[Production of Non-aqueous Electolyte Secondary Battery]

The above positive electrode, the above negative electrode, the above non-aqueous electrolyte solution, and a separator were used to produce a non-aqueous electrolyte secondary battery by the following procedures.

(1) The positive electrode and the negative electrode were wound together with the separator therebetween to produce an electrode assembly having a wound structure.

(2) Insulating plates were each disposed above and under the electrode assembly, and the wound electrode assembly was housed in a cylindrical battery exterior can having a diameter of 18 mm and a height of 65 mm.

(3) The current collecting tab of the negative electrode was welded on the inner surface of the bottom of battery exterior can, and simultaneously, the current collecting tab of the positive electrode was welded to the bottom plate of the sealing assembly.

(4) The non-aqueous electrolyte solution was injected from the opening of the battery exterior can. Thereafter, the battery exterior can was sealed with a sealing assembly.

The above non-aqueous electrolyte secondary battery was subjected to performance evaluation by the following methods. The evaluation results were shown in Table 1A, 1B.

[Evaluation of Battery Capacity]

The above non-aqueous electrolyte secondary battery was charged at a constant current of 1 It=2900 mA under an environment of 25° C. to a battery voltage of 4.2 V, and thereafter, discharged at a constant current of 1 It to a battery voltage of 2.5 V, and the discharge capacity (battery capacity) was determined.

[Evaluation of High Rate Discharge Characteristics]

The above non-aqueous electrolyte secondary battery was charged at a constant current of 0.2 It under an environment of 25° C. to a battery voltage of 4.2 V and thereafter, discharged at a constant current of 0.2 It to a battery voltage of 2.5 V, and the 0.2-It capacity was measured. Next, the battery was charged in the same manner and discharged at a constant current of 1 It to a battery voltage of 2.5 V, and the 1-It capacity was measured. Then, the high rate discharge capacity retention was determined by the following equation. A higher rate discharge capacity retention means better high rate discharge characteristics.

High rate discharge capacity retention=1-It capacity/
0.2-It capacity×100

[Evaluation of Cyclic Characteristics]

The above non-aqueous electrolyte secondary battery was charged and discharged under a temperature condition of 25° C. and under the following conditions, and the capacity retention was determined.

<Charge and Discharge Conditions>

Charge: A constant current charging was conducted at a constant current of 1 It to a battery voltage of 4.2 V. Additionally, a constant voltage charging was conducted at a voltage of 4.2 V until the current value reached 145 mA.

Discharge: A constant current discharging was conducted at a constant current of 1 It to a voltage of 2.5 V.

The cycle consisting of the charge and the discharge was conducted 100 times, and the cycle capacity retention was calculated by the following equation. A higher cycle capacity retention means better cyclic characteristics.

Cycle capacity retention=discharge capacity at 100th cycle/discharge capacity at first cycle×100

[Amount of Ni and Mn Dissolved]

The non-aqueous electrolyte secondary battery was fully charged and then stored in a 60° C. thermostatic chamber for 96 hours. Then, the non-aqueous electrolyte secondary battery after a lapse of 96 hours was disassembled in a glove box, and the negative electrode was taken out. The negative electrode taken out was immersed in 100 ml of a 0.2 N hydrochloric acid aqueous solution at 100° C. for 10 minutes to thereby dissolve the Mn and Ni deposited on the negative electrode. Further, after the negative electrode was filtered off, the filtrate was made up to volume in a volumetric flask to thereby obtain a sample. The amount of Mn and Ni in the sample was quantitatively determined by Inductively Coupled Plasma-Atomic Emission Spectrometry (ICP-AES), and the amount of Mn and Ni dissolved was calculated by the following equation. A lower amount of Mn and Ni dissolved means that the amount of Mn and Ni dissolved from the positive electrode active material in the above storage process was suppressed.

Amount of Mn or Ni dissolved=mass of Mn or
Ni/mass of negative electrode

Example 2

A non-aqueous electrolyte secondary battery was produced in the same manner as in Example 1 except that the B-containing metal complex was added such that the amount of B was 0.01 parts by mass (1000 ppm) based on 100 parts by mass of the first fired product and the Al-containing metal complex was added such that the amount of Al was 0.01 parts by mass (1000 ppm) based on 100 parts by mass of the first fired product in the synthesis of the Ni-containing lithium composite oxide a, and the performance evaluation was conducted in the same manner as in Example 1.

The Ni-containing lithium composite oxide a of Example 2 had an average primary particle size of 3 μm and an average secondary particle size of 4 μm. The crystallite size was 198 nm. In the composition, the proportion of Ni was 60 mol %, the proportion of Mn was 20 mol %, the proportion of Co was 20 mol %, B was 1000 ppm, and Al was 1000 ppm.

Example 3

A non-aqueous electrolyte secondary battery was produced in the same manner as in Example 1 except that the B-containing metal complex was added such that the amount of B was 0.002 parts by mass (200 ppm) based on 100 parts by mass of the first fired product and the Al-containing metal complex was added such that the amount of Al was 0.002 parts by mass (200 ppm) based on 100 parts by mass of the first fired product in the synthesis of the Ni-containing lithium composite oxide a, and the performance evaluation was conducted in the same manner as in Example 1.

The Ni-containing lithium composite oxide a of Example 3 had an average primary particle size of 3 μm and an average secondary particle size of 4 μm. The crystallite size was 205 nm. In the composition, the proportion of Ni was 60 mol %, the proportion of Mn was 20 mol %, the proportion of Co was 20 mol %, B was 200 ppm, and Al was 200 ppm.

Example 4

A non-aqueous electrolyte secondary battery was produced in the same manner as in Example 1 except that the transition metal oxide represented by $Ni_{0.60}Co_{0.20}Mn_{0.20}(OH)_2$ (D50: 17.0 μm, tap density: 2.3 g/cc) was replaced by a transition metal oxide represented by $Ni_{0.60}Co_{0.20}Mn_{0.20}(OH)_2$ (D50: 10.1 μm, tap density: 1.9 g/cc) in the synthesis of Ni-containing lithium composite oxide b, and the performance evaluation was conducted in the same manner as in Example 1.

The Ni-containing lithium composite oxide b of Example 4 had an average primary particle size of 0.1 μm and an average secondary particle size of 10 μm. The crystallite size was 140 nm. The composition was $Li_{1.07}Ni_{0.60}Co_{0.20}Mn_{0.20}O_2$.

Example 5

A non-aqueous electrolyte secondary battery was produced in the same manner as in Example 1 except that the transition metal oxide represented by $Ni_{0.60}Co_{0.20}Mn_{0.20}(OH)_2$ (D50: 17.0 μm, tap density: 2.3 g/cc) was replaced by a transition metal oxide represented by $Ni_{0.60}Co_{0.20}Mn_{0.20}(OH)_2$ (D50: 19.4 μm, tap density: 2.5 g/cc) in the synthesis of Ni-containing lithium composite oxide b, and the performance evaluation was conducted in the same manner as in Example 1.

The Ni-containing lithium composite oxide b of Example 5 had an average primary particle size of 0.1 μm and an average secondary particle size of 20 μm. The crystallite size was 125 nm. The composition was $Li_{1.07}Ni_{0.60}Co_{0.20}Mn_{0.20}O_2$.

Example 6

A non-aqueous electrolyte secondary battery was produced in the same manner as in Example 1 except that the firing temperature in the first firing step was changed from 925° C. to 900° C. in the synthesis of the Ni-containing lithium composite oxide a, and the performance evaluation was conducted in the same manner as in Example 1.

The Ni-containing lithium composite oxide a of Example 6 had an average primary particle size of 1 μm and an average secondary particle size of 4 μm. The crystallite size was 145 nm. In the composition, the proportion of Ni was 60 mol %, the proportion of Mn was 20 mol %, the proportion of Co was 20 mol %, B was 500 ppm, and Al was 500 ppm.

Example 7

A non-aqueous electrolyte secondary battery was produced in the same manner as in Example 1 except that the transition metal hydroxide represented by $Ni_{0.60}Co_{0.20}Mn_{0.20}(OH)_2$ (D50: 3.7 μm, tap density: 1.7 g/cc) was replaced by a transition metal hydroxide represented by $Ni_{0.60}Co_{0.20}Mn_{0.20}(OH)_2$ (D50: 5.5 μm, tap density: 1.8 g/cc) in the synthesis of the Ni-containing lithium composite oxide a, and the performance evaluation was conducted in the same manner as in Example 1.

The Ni-containing lithium composite oxide a of Example 7 had an average primary particle size of 3 μm and an average secondary particle size of 6 μm. The crystallite size was 199 nm. In the composition, the proportion of Ni was 60 mol %, the proportion of Mn was 20 mol %, the proportion of Co was 20 mol %, B was 500 ppm, and Al was 500 ppm.

Example 8

A non-aqueous electrolyte secondary battery was produced in the same manner as in Example 1 except that the firing temperature in the first firing step was changed from 885° C. to 870° C. in the synthesis of the Ni-containing lithium composite oxide b, and the performance evaluation was conducted in the same manner as in Example 1.

The Ni-containing lithium composite oxide b of Example 8 had an average primary particle size of 0.05 μm and an average secondary particle size of 16 μm. The crystallite size was 120 nm. The composition was $Li_{1.07}Ni_{0.60}Co_{0.20}Mn_{0.20}O_2$.

Example 9

A non-aqueous electrolyte secondary battery was produced in the same manner as in Example 1 except that a positive electrode active material obtained by mixing the Ni-containing lithium composite oxides a and b at a mass ratio of 5:95 was used in the production of the positive electrode, and the performance evaluation was conducted in the same manner as in Example 1.

Example 10

A non-aqueous electrolyte secondary battery was produced in the same manner as in Example 1 except that a positive electrode active material obtained by mixing the Ni-containing lithium composite oxides a and b at a mass ratio of 55:45 was used in the production of the positive electrode, and the performance evaluation was conducted in the same manner as in Example 1.

Comparative Example 1

A non-aqueous electrolyte secondary battery was produced in the same manner as in Example 1 except that neither B nor Al was added in the synthesis of the Ni-containing lithium composite oxide a, and the performance evaluation was conducted in the same manner as in Example 1.

The Ni-containing lithium composite oxide a of Comparative Example 1 had an average primary particle size of 3 μm and an average secondary particle size of 4 μm. The crystallite size was 208 nm. In the composition, the proportion of Ni was 60 mol %, the proportion of Mn was 20 mol %, and the proportion of Co was 20 mol %.

Comparative Example 2

A non-aqueous electrolyte secondary battery was produced in the same manner as in Example 1 except that the transition metal oxide represented by $Ni_{0.60}Co_{0.20}Mn_{0.20}(OH)_2$ (D50: 17.0 μm, tap density: 2.3 g/cc) was replaced by a transition metal oxide represented by $Ni_{0.60}Co_{0.20}Mn_{0.20}(OH)_2$ (D50: 9.2 μm, tap density: 1.8 g/cc) in the synthesis of Ni-containing lithium composite oxide b, and the performance evaluation was conducted in the same manner as in Example 1.

The Ni-containing lithium composite oxide b of Comparative Example 2 had an average primary particle size of 0.1 μm and an average secondary particle size of 9 μm. The crystallite size was 145 nm. The composition was $Li_{1.07}Ni_{0.60}Co_{0.20}Mn_{0.20}O_2$.

Comparative Example 3

A non-aqueous electrolyte secondary battery was produced in the same manner as in Example 1 except that the transition metal oxide represented by $Ni_{0.60}Co_{0.20}Mn_{0.20}(OH)_2$ (D50: 17.0 μm, tap density: 2.3 g/cc) was replaced by a transition metal oxide represented by $Ni_{0.60}Co_{0.20}Mn_{0.20}(OH)_2$ (D50: 22.2 μm, tap density: 2.7 g/cc) in the synthesis of Ni-containing lithium composite oxide b, and the performance evaluation was conducted in the same manner as in Example 1.

The Ni-containing lithium composite oxide b of Comparative Example 3 had an average primary particle size of 0.1 μm and an average secondary particle size of 22 μm. The crystallite size was 110 nm. The composition was $Li_{1.07}Ni_{0.60}Co_{0.20}Mn_{0.20}O_2$.

Comparative Example 4

A non-aqueous electrolyte secondary battery was produced in the same manner as in Example 1 except that the firing temperature in the first firing step was changed from 925° C. to 890° C. in the synthesis of the Ni-containing lithium composite oxide a, and the performance evaluation was conducted in the same manner as in Example 1.

The Ni-containing lithium composite oxide a of Comparative Example 4 had an average primary particle size of 0.8 μm and an average secondary particle size of 4 μm. The crystallite size was 135 nm. In the composition, the proportion of Ni was 60 mol %, the proportion of Mn was 20 mol %, the proportion of Co was 20 mol %, B was 500 ppm, and Al was 500 ppm.

Comparative Example 5

A non-aqueous electrolyte secondary battery was produced in the same manner as in Example 1 except that the transition metal hydroxide represented by $Ni_{0.60}Co_{0.20}Mn_{0.20}(OH)_2$ (D50: 3.7 μm, tap density: 1.7 g/cc) was replaced by a transition metal hydroxide represented by $Ni_{0.6}Co_{0.20}Mn_{0.20}(OH)_2$ (D50: 8.1 μm, tap density: 1.7 g/cc) in the synthesis of the Ni-containing lithium composite oxide a, and the performance evaluation was conducted in the same manner as in Example 1.

The Ni-containing lithium composite oxide a of Comparative Example 5 had an average primary particle size of 3 μm and an average secondary particle size of 8 μm. The crystallite size was 198 nm. In the composition, the proportion of Ni was 60 mol %, the proportion of Mn was 20 mol %, the proportion of Co was 20 mol %, B was 500 ppm, and Al was 500 ppm.

Comparative Example 6

A non-aqueous electrolyte secondary battery was produced in the same manner as in Example 1 except that the firing temperature in the first firing step was changed from 885° C. to 850° C. in the synthesis of the Ni-containing lithium composite oxide b, and the performance evaluation was conducted in the same manner as in Example 1.

The Ni-containing lithium composite oxide b of Comparative Example 6 had an average primary particle size of 0.03 μm and an average secondary particle size of 16 μm. The crystallite size was 100 nm. The composition was $Li_{1.07}Ni_{0.60}Co_{0.20}Mn_{0.20}O_2$.

Comparative Example 7

A non-aqueous electrolyte secondary battery was produced in the same manner as in Example 1 except that only the Ni-containing lithium composite oxide b was used as the positive electrode active material in the production of the positive electrode, and the performance evaluation was conducted in the same manner as in Example 1.

Comparative Example 8

A non-aqueous electrolyte secondary battery was produced in the same manner as in Example 1 except that only the Ni-containing lithium composite oxide a was used as the positive electrode active material in the production of the positive electrode, and the performance evaluation was conducted in the same manner as in Example 1.

TABLE 1A

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Positive electrode active material | Ni-containing lithium composite oxide a | Primary particle size (μm) | 3 | 3 | 3 | 3 | 3 | 1 | 3 | 3 | 3 | 3 |
| | | Secondary particle size (μm) | 4 | 4 | 4 | 4 | 4 | 4 | 6 | 4 | 4 | 4 |
| | | Amount of B added (ppm) | 500 | 1000 | 200 | 500 | 500 | 500 | 500 | 500 | 500 | 500 |
| | | Amount of Al added (ppm) | 500 | 1000 | 200 | 500 | 500 | 500 | 500 | 500 | 500 | 500 |
| | Ni-containing lithium composite oxide b | Primary particle size (μm) | 0.1 | 0.1 | 0.1 | 0.1 | 0.1 | 0.1 | 0.1 | 0.05 | 0.1 | 0.1 |
| | | Secondary particle size (μm) | 16 | 16 | 16 | 10 | 20 | 16 | 16 | 16 | 16 | 16 |
| | Mixing ratio of Ni-containing lithium composite oxide a/b | | 50/50 | 50/50 | 50/50 | 50/50 | 50/50 | 50/50 | 50/50 | 50/50 | 5/95 | 55/45 |
| Evaluation items | Battery capacity * Battery capacity of Example 1 is taken as 100 | | 100 | 96 | 102 | 95 | 101 | 101 | 95 | 100 | 92 | 93 |
| | High rate discharge capacity retention (%) | | 90 | 89 | 90 | 94 | 86 | 94 | 89 | 90 | 89 | 90 |
| | Cycle capacity retention (%) | | 90 | 92 | 85 | 86 | 91 | 84 | 89 | 85 | 90 | 90 |
| | Amount dissolved (ppm) | Mn | 10 | 8 | 13 | 12 | 9 | 12 | 11 | 13 | 10 | 11 |
| | | Ni | 30 | 25 | 37 | 37 | 26 | 37 | 33 | 37 | 29 | 30 |

TABLE 1B

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Positive electrode active material | Ni-containing lithium composite oxide a | Primary particle size (μm) | 3 | 3 | 3 | 0.8 | 3 | 3 | — | 3 |
| | | Secondary particle size (μm) | 4 | 4 | 4 | 4 | 8 | 4 | — | 4 |
| | | Amount of B added (ppm) | 0 | 500 | 500 | 500 | 500 | 500 | — | 500 |
| | | Amount of Al added (ppm) | 0 | 500 | 500 | 500 | 500 | 500 | — | 500 |
| | Ni-containing lithium composite oxide b | Primary particle size (μm) | 0.1 | 0.1 | 0.1 | 0.1 | 0.1 | 0.03 | 0.1 | — |
| | | Secondary particle size (μm) | 16 | 9 | 22 | 16 | 16 | 16 | 16 | — |

TABLE 1B-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | Mixing ratio of Ni-containing lithium composite oxide a/b | 50/50 | 50/50 | 50/50 | 50/50 | 50/50 | 50/50 | 0/100 | 100/0 |
| Evaluation items | Battery capacity * Battery capacity of Example 1 is taken as 100 | 100 | 78 | 102 | 101 | 79 | 100 | 71 | 66 |
| | High rate discharge capacity retention (%) | 71 | 95 | 77 | 95 | 89 | 91 | 85 | 92 |
| | Cycle capacity retention (%) | 69 | 78 | 92 | 77 | 89 | 77 | 90 | 91 |
| | Amount dissolved Mn (μm) | 30 | 18 | 8 | 20 | 11 | 19 | 11 | 10 |
| | Amount dissolved Ni (μm) | 89 | 50 | 25 | 60 | 33 | 56 | 31 | 29 |

As the results shown in Table 1A, 1B, in all the batteries of Examples, the discharge capacity, the high rate discharge capacity retention, and the high cycle capacity retention were high. In all the batteries of Examples, the amount of Ni and Mn dissolved after storage in a fully charged state at 60° C. for 96 hours was suppressed to less than 50 ppm. That is, the batteries of Examples were able to achieve a large capacity, good cyclic characteristics, and high rate discharge characteristics of the battery and suppress the amount of Ni and Mn dissolved from the positive electrode active material. In contrast, in Comparative Examples, no battery satisfying all of these characteristics was obtained.

REFERENCE SIGNS LIST

10 non-aqueous electrolyte secondary battery, 11 positive electrode, 12 negative electrode, 13 separator, 14 electrode assembly, 15 battery case, 16 exterior can, 17 sealing assembly, 18, 19 insulating plate, 20 positive electrode tab, 21 negative electrode tab, 22 grooved portion, 23 bottom plate, 24 lower vent member, 25 insulating member, 26 upper vent member, 27 cap, 28 gasket, 32, 33 primary particle

The invention claimed is:

1. A positive electrode active material for a non-aqueous electrolyte secondary battery, including Ni-containing lithium composite oxides a and b, wherein
   an average primary particle size of the Ni-containing lithium composite oxide a is 1 μm or more and larger than an average primary particle size of the Ni-containing lithium composite oxide b,
   an average secondary particle size of the Ni-containing lithium composite oxide a is 2 μm to 6 μm,
   the Ni-containing lithium composite oxide b has an average primary particle size of 0.05 μm or more and an average secondary particle size of 10 μm to 20 μm,
   the Ni-containing lithium composite oxide a includes Mn, includes at least either one of B and Al, contains 55 mol % or more of Ni based on the total number of moles of the metal elements except for Li, and has a crystallite size of 100 nm to 200 nm,
   the Ni-containing lithium composite oxide b includes Mn, is free of B and Al or has smaller contents of B and Al than those in the Ni-containing lithium composite oxide a, contains 55 mol % or more of Ni based on the total number of moles of the metal elements except for Li, and has a crystallite size of 100 nm to 200 nm, and
   a mass ratio between the Ni-containing lithium composite oxide a and the Ni-containing lithium composite oxide b is 5:95 to 55:45.

2. The positive electrode active material for a non-aqueous electrolyte secondary battery according to claim 1, wherein
   a proportion by mass of each of B and Al included in the Ni-containing lithium composite oxide a is in a range of 200 ppm to 1000 ppm with respect to the Ni-containing lithium composite oxide a.

3. A non-aqueous electrolyte secondary battery, comprising:
   a positive electrode including the positive electrode active material for a non-aqueous electrolyte secondary battery according to claim 1;
   a negative electrode; and
   a non-aqueous electrolyte.

* * * * *